United States Patent [19]
Lambotte et al.

[11] Patent Number: 5,569,534
[45] Date of Patent: Oct. 29, 1996

[54] REACTANT IN THE FORM OF GRANULES FOR THERMOCHEMICAL SYSTEMS

[75] Inventors: Benoit Lambotte, Vaucresson; Bernard Spinner, Corneilla Del Vercol; Charles Timoney, L'Etang La Ville; Jacques Prosdocimi, Canohes, all of France

[73] Assignee: Elf Aquitaine, France

[21] Appl. No.: 374,869

[22] Filed: Jan. 19, 1995

[51] Int. Cl.⁶ .................... B32B 5/16; B01J 20/02
[52] U.S. Cl. ................ 428/402; 502/180; 502/410; 502/417; 502/439
[58] Field of Search .................. 428/402, 403, 428/404, 408, 540, 688, 913; 502/174, 180, 416, 417, 410, 439; 423/448, 460

[56] References Cited

U.S. PATENT DOCUMENTS 4,595,774  6/1986  Coste et al. ............... 556/118
4,906,258  3/1990  Balat et al. ................ 55/74
5,283,219  2/1994  Mauran et al. ............ 502/417

FOREIGN PATENT DOCUMENTS 2546278  11/1984  France ............. C09K 5/00
2553183   4/1985  France ............. F25B 29/00

Primary Examiner—Hoa T. Le
Attorney, Agent, or Firm—Bacon & Thomas

[57] ABSTRACT

Reactant for thermochemical systems, including a support which is, for example, recompressed expanded graphite or vermiculite, and an active agent, for example a salt. According to the invention, the support is in the form of granules of graphite having a density of between 0.20 and 0.5 g/cm³ and whose diameter lies between 0.2 cm and 2.5 cm.

5 Claims, 1 Drawing Sheet

U.S. Patent      Oct. 29, 1996      5,569,534
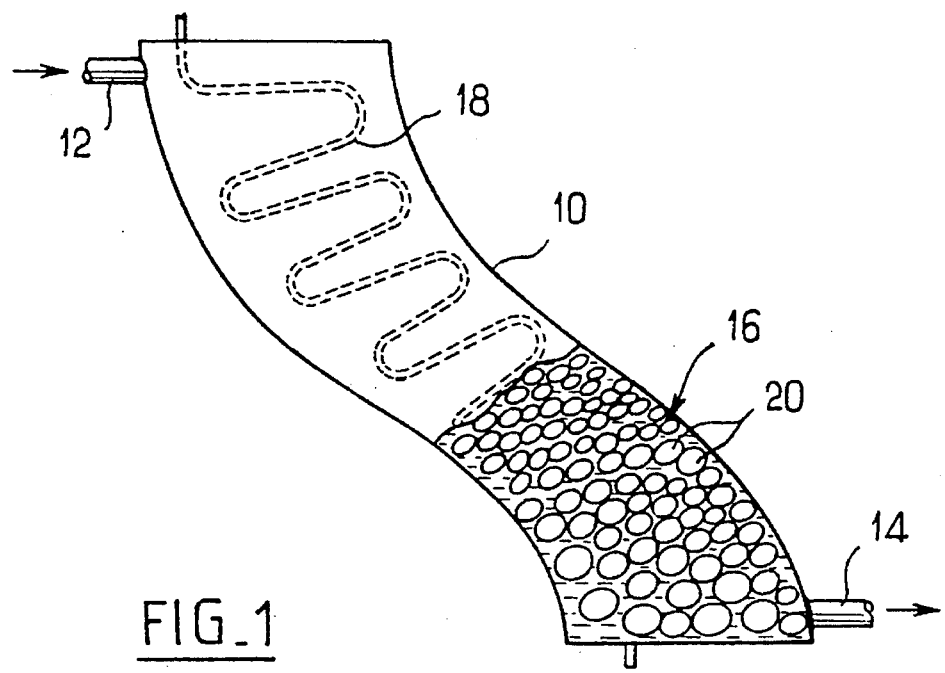
FIG_1
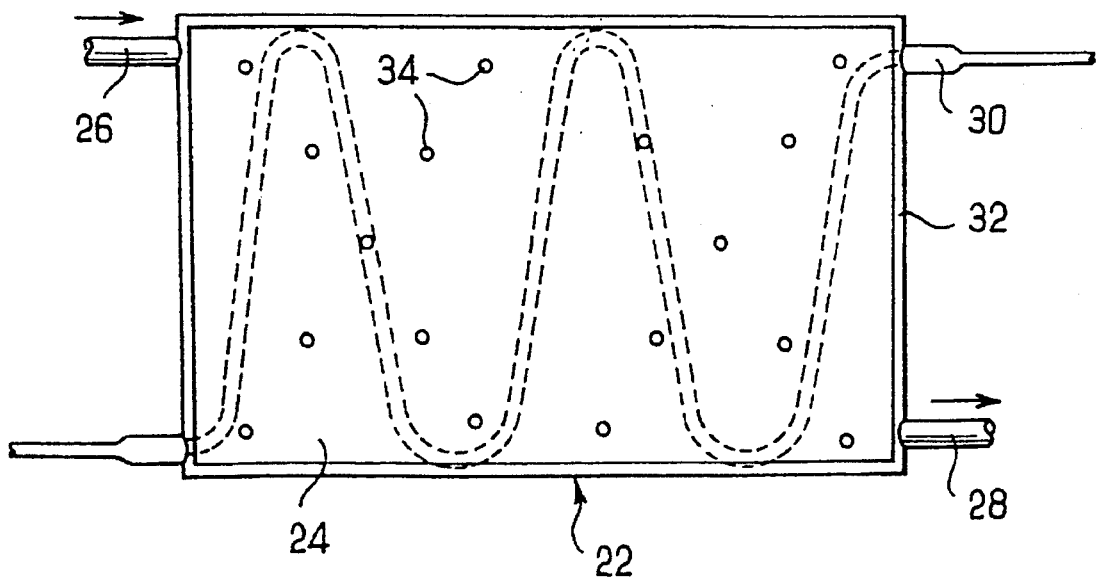
FIG_2

5,569,534

REACTANT IN THE FORM OF GRANULES FOR THERMOCHEMICAL SYSTEMS

BACKGROUND OF THE INVENTION

1. Field of the Invention

The present invention relates to a reactant in the form of granules for thermochemical systems.

2. Description of Related Art

In the field of thermochemical systems based on the thermal characteristics of the reaction between a solid and a gas, or of the adsorption of a gas on a solid, a mixture is employed of a finely divided material, such as expanded graphite, and of a solid reactant, i.e., active agent, for example a salt, or, correspondingly, an adsorbent such as a zeolite. The mixture of expanded graphite and of this solid, which is the site of a chemical reaction or of a physical adsorption, has many advantages during a chemical reaction or a physical adsorption between the solid and the gas. The expanded graphite is in the form of flakes with a very large specific surface and allows the gas to diffuse even in a confined environment.

Document FR-A-2 547 512 describes a process for carrying out a solid gas reaction, in which a mixture of expanded graphite and of a salt is employed as reaction site of a thermochemical system, this mixture being in pulverulent form. This mixture makes it possible to fill reaction chambers of a thermochemical system which are irregular or nonrectilinear in shape. However, the thermal conductivity of the mixture, while higher than that of a salt, is too low to enable the thermochemical systems to achieve satisfactory performance levels. In addition, the charging of a reaction chamber with a pulverulent mixture of expanded graphite and of salt is a difficult operation, since the two components tend to segregate.

In document WO 91/15292 it has been proposed to produce an active composite by preparing a support formed by a block of recompressed expanded graphite which is subsequently impregnated from the outside, for example, with a solution of an active agent, for example a salt, the impregnated support being subsequently dried to produce the active composite. The active composite thus produced has a thermal conductivity which is markedly higher than that of the expanded graphite in flake form, while retaining a high porosity to gas flow.

Despite undoubted advantages, the active composite prepared according to the process described in document WO 91/15292 is not entirely satisfactory. In fact, since this active composite is in the form of rigid blocks which are generally of a cylindrical shape, the reaction chambers intended to receive such a block are limited to rectilinear shapes.

In addition, in order to make it possible to ensure certain applications, it would be appropriate to have a supple or flexible reaction chamber. An active composite in the form of rigid blocks does not allow such reaction chambers to be filled.

SUMMARY OF THE INVENTION

The subject of the present invention is therefore a reactant for thermochemical systems which has a good thermal conductivity and which permits the filling of reaction chambers of irregular or nonrectilinear shapes.

Another subject of the present invention is a reactant for thermochemical systems which makes it possible to employ supple or flexible reaction chambers.

To do this, the invention provides a reactant for thermochemical systems including a support and an active agent, characterised in that it is in the form of granules of graphite having a density of between 0.02 and 0.5 gm/cm$^3$. Unless stated otherwise, all values of density are expressed by conventional units (g/cm$^3$ or gcm$^{-3}$), and whose diameter lies between 0.2 cm and 2.5 cm.

Other characteristics and advantages of the present invention will appear more clearly on reading the description below, given with reference to the attached drawings, in which:

BRIEF DESCRIPTION OF THE DRAWINGS

FIG. 1 is a diagram of a reaction chamber of a thermochemical system containing a reactant according to the invention; and FIG. 2 is a diagram of a reaction chamber according to a second embodiment of the invention.

DETAILED DESCRIPTION OF THE PREFERRED EMBODIMENTS

A reaction chamber 10 of irregular or nonrectilinear shape is shown diagrammatically in FIG. 1. The chamber 10 is leakproof and constructed in metal, preferably in stainless steel. The chamber 10 comprises an entry 12 and an exit 14 for a gas which is intended to react with a reactant, represented generally as 16, arranged in the chamber 10. The chamber 10 is provided with a heat-transfer system 18 intended to permit the exchange of thermal energy between the reactant 16 and a source which is not shown, outside the chamber.

According to the invention, the chamber 16 contains reactant in the form of granules. As can be seen in FIG. 1 the reactant is made up of granules 20 which, in the example illustrated, are generally spherical. These granules may include various materials, as will be described below.

EXAMPLE I

Spherical granules which have a diameter of between 2 mm and 2.5 cm and, preferably, between 5 mm and 1.5 cm are formed by moulding by recompressing expanded graphite of density between 0.001 and 0.02 so that its density lies between 0.02 and 0.5. These granules are subsequently impregnated with an active agent, for example a salt, as described in document WO 91/15292.

The chamber 10 is filled with granules which necessarily leave empty spaces between them. In order to prevent a large reduction in the overall thermal conductivity of the reactant present in the chamber 10, the interstices between the granules are filled with expanded graphite in powder form. The mixture of granules and of expanded graphite may be advantageously compressed in the chamber in order to improve the thermal conductivity with the wall of the chamber.

EXAMPLE II

Spherical granules similar in size to those of Example I are prepared by compressing a pulverulent mixture of expanded graphite of density between 0.001 and 0.02 and of an active agent, for example a salt. The pulverulent mixture is compressed in a suitable mould in order that the resulting granules should have a graphite density of between 0.02 and 0.5. The granules are employed for filling a chamber 10 as described in Example I.

EXAMPLE III

Granules of irregular shape, 0.2 to 1.5 cm in size, are formed from an exfoliated lamellar compound such as vermiculite. These granules are immersed in a solution of an active agent, for example a salt, and are subsequently dried in order to create impregnated granules. These impregnated granules are employed, in combination with expanded graphite, to fill reaction chambers. In an alternative embodiment, impregnated granules are mixed with expanded graphite and the resulting mixture is subsequently recompressed in a mould in order to form beads of recompressed expanded graphite containing granules of impregnated vermiculite. These beads are employed, in combination with expanded graphite, to fill reaction chambers, for example as described in Example I.

In order to ensure that a reaction chamber of irregular shape is filled homogeneously with a mixture of reactant in the form of granules and of expanded graphite, the filling operation can be carried out by entraining the mixture with a stream of dry air or of inert gas. In this case the filling is performed via one end of the reaction chamber, the opposite end being selectively open in order to allow the air to leave.

In an alternative embodiment the granules may be moulded with a substantially cubical shape. These granules are subsequently subjected to a treatment which gives them a polyhedral or generally rounded shape.

It is also possible to envisage filling a reaction chamber which initially is substantially rectilinear in shape and, once the chamber is filled and closed, giving it another shape, either mechanically or by thermoforming. The granular nature of the reactant allows a considerable deformation of the reaction chamber.

The granular nature of the reactant according to the invention also makes it possible to change the shape of a reaction chamber after filling and also to envisage supple reaction chambers.

Shown in FIG. 2 is a reaction chamber 22 including a supple enclosure 24 which, in the example illustrated, is substantially rectangular. The reaction chamber 22 comprises an entry 26 and an exit 28 for a gas intended to react with a reactant arranged inside the chamber, and a heat transfer system 30 intended to permit the exchange of thermal energy between the reactant and a source, not shown, outside the reaction chamber.

The supple enclosure 24 is made up of two faces, each of multilayer construction, joined together by welds 32. Each face of the supple enclosure includes at least one layer of plastic bonded to a metal layer. In order that the enclosure should keep its substantially flattened shape, the two faces are joined together, for example by spot welds 34. The supple enclosure 24 is filled with granules of reactant and expanded graphite as in the preceding examples.

The heat transfer system 30 may include a space defined between two layers of one of the faces of the enclosure.

We claim:

1. Reactant for thermochemical systems comprising a support and an active agent, said support being in the form of granules and said active agent being impregnated in said granules, wherein said granules comprise recompressed expanded graphite having a density of between 0.02 and 0.5 g/cm$^3$ and a diameter between 0.2 and 2.5 cm and wherein said support is capable of filling a reaction chamber of irregular or non-rectilinear shape.

2. Reactant according to claim 1, wherein said support further comprises an exfoliated lamellar compound impregnated with the active agent.

3. Reactant as claimed in claim 2, wherein said exfoliated lamellar compound is vermiculite.

4. Reactant according to claim 1, wherein the granules are of a substantially spherical shape with a diameter of between 0.5 and 1.5 cm.

5. Reactant as claimed in claim 1, wherein said support is further comprised of granules of recompressed expanded graphite and an exfoliated lamellar compound and said active agent is impregnated in said exfoliated lamellar compound.

\* \* \* \* \*